(12) United States Patent
Newbacher et al.

(10) Patent No.: US 7,029,524 B2
(45) Date of Patent: Apr. 18, 2006

(54) WATER-BASED SPRAY MARKING COMPOSITION

(75) Inventors: Christopher J. Newbacher, Avon, OH (US); Candido N. Vina, Uniontown, OH (US); Vincent A. Veiram, North Royalton, OH (US)

(73) Assignee: Day-Glo Color Corp., Cleveland, OH (US)

( * ) Notice: Subject to any disclaimer, the term of this patent is extended or adjusted under 35 U.S.C. 154(b) by 0 days.

(21) Appl. No.: 10/878,819

(22) Filed: Jun. 28, 2004

(65) Prior Publication Data

US 2004/0261655 A1    Dec. 30, 2004

Related U.S. Application Data

(60) Provisional application No. 60/481,035, filed on Jun. 27, 2003.

(51) Int. Cl.
*C09D 11/00* (2006.01)
(52) U.S. Cl. .............. 106/31.58; 106/31.86; 106/31.64
(58) Field of Classification Search ............ 106/31.58, 106/31.86
See application file for complete search history.

(56) References Cited

U.S. PATENT DOCUMENTS

| | | | | |
|---|---|---|---|---|
| 4,247,339 | A | * | 1/1981 | Bolton et al. ............... 106/468 |
| 4,384,661 | A | * | 5/1983 | Page et al. .................. 222/394 |
| 4,579,581 | A | * | 4/1986 | Kay et al. ................... 504/244 |
| 5,158,609 | A | | 10/1992 | O'Neill |
| 5,196,459 | A | | 3/1993 | Smrt et al. |
| 5,549,836 | A | * | 8/1996 | Moses ........................ 508/183 |
| 6,077,898 | A | | 6/2000 | Flores |

OTHER PUBLICATIONS

Chapter 16, "Fluorescence" by Newbacher, et al., *Coloring of Plastics, Fundamentals*, 2nd Edition, Edited by Robert A. Charvat, John Wiley & Sons, Inc., Hoboken, New Jersey, 2004, pp. 242-257.
A copy of the International Search Report dated Jan. 4, 2005.

* cited by examiner

*Primary Examiner*—J. A. Lorengo
*Assistant Examiner*—Veronica F. Faison
(74) *Attorney, Agent, or Firm*—Calfee, Halter & Griswold LLP

(57) ABSTRACT

A water-based, aerosol marking composition that adheres to a variety of surfaces but is removable by mechanical rubbing with a dry cloth or by washing with water is provided. The composition comprises 10 to 50% by weight water; 5 to 50% by weight of a solvent selected from the group consisting of a C6 to C15 aliphatic solvent, an aromatic solvent comprising 10 or fewer carbon atoms, an ether, and an alcohol, or combinations thereof; 0.1 to 4% of an emulsifier having a hydrophile to lipophile balance of from 1.8 to 16.7; a marking agent; and 10 to 45% propellant. In a preferred embodiment the composition lacks or contains only trace amounts of an alkyd-based drying oil, polyvinylpyrrrolidone, or polyvinyl alcohol, or another agent that serves as an adhesive for the pigment particles. In certain embodiments, the composition comprises an inorganic filler and from 0.05% to 3% surfactant. Optionally, the composition comprises an anti-foaming agent, corrosion inhibitor, an anti-freeze agent, or combinations thereof. Also provided is a liquid composition that can be used as a spray marking composition or combined with a propellant to prepare a water-based, aerosol marking composition.

28 Claims, No Drawings

WATER-BASED SPRAY MARKING COMPOSITION

CROSS-REFERENCE TO RELATED APPLICATIONS

This application claims priority to U.S. Provisional Patent Application Ser. No. 60/481,035 filed on Jun. 27, 2003, which is incorporated herein by reference in its entirety.

TECHNICAL FIELD OF THE INVENTION

The present application is directed to an improved water-based spray composition for marking or "painting" the surface of a substrate. More specifically, the present application is directed to a water-based, aerosol marking composition that lacks or contains only trace amounts of an alkyd-based drying oil, polyvinylpyrrolidine, polyvinyl alcohol, or combinations thereof, but still produces a mark that adheres to the surface of various substrates.

BACKGROUND OF THE INVENTION

A number of water based, aerosol compositions for marking various surfaces have been developed. A number of the known marking compositions comprise a binder. A binder is the film-forming ingredient in a paint. Examples include an alkyd-based drying oil or a water-soluble material that serves as an adhesive for the pigment particles. Examples of water-soluble binders include (PVP) polyvinylpyrrolidone and polyvinyl alcohol (PVA). PVP and PVA both serve to create adhesion between the pigment particle and the substrate being sprayed.

Some of the known water-based, aerosol marking compositions provide a permanent or semi-permanent, i.e., a durable, white or colored mark. In some cases, the mark is lost when the color fades over time due to exposure to sunlight. In some cases the composition provides a white or colored mark that is removable by washing. However, none of the known compositions provide a temporary mark that can be removed with minimal effort by wiping with a dry cloth.

Thus, it is desirable to have a water-based, aerosol marking composition that is able to adhere to variety of surfaces, yet can be removed with minimal effort by rubbing with a dry cloth. A water-based, aerosol marking composition that is non-flammable and produces a mark that can be removed by erasing or washing with water is also desirable. A temporary water-based, aerosol marking composition that has low toxicity levels is especially desirable.

SUMMARY OF THE INVENTION

The present application provides a water-based, aerosol marking composition that adheres to a variety of surfaces but is removable by rubbing with a dry cloth or by washing with water.

The composition comprises 10 to 50% by weight water; 5 to 50% by weight of a solvent selected from the group consisting of a C6 to C15 aliphatic solvent, an aromatic solvent comprising 10 or fewer carbon atoms, an ether, and an alcohol, or combinations thereof; 0.1 to 4% by weight of an emulsifier having a hydrophile to lipophile balance of from 1.8 to 16.7; a marking agent; and 10 to 45% by weight of a propellant. The marking agent is a dye or a pigment, or a combination thereof. The present composition does not require a binder. Thus, in a preferred embodiment the composition lacks or contains only trace amounts of an added alkyd-based drying oil, polyvinylpyrrrolidone, or polyvinyl alcohol, or another agent that serves to enhance adhesion between the marking agent and the substrate onto which the composition is sprayed. Preferably, the composition comprises an inorganic filler. More preferably, the composition comprises from 10 to 50% by weight of an inorganic filler and from 0.05% to 3% by weight of a surfactant. Optionally, the composition comprises an anti-foaming agent, corrosion inhibitor, an anti-freeze agent, or a combination thereof. In a preferred embodiment, the propellant imparts non-flammability characteristics and the composition is non-flammable.

The present application also provides a liquid composition that can be used as a spray marking composition or combined with a propellant to prepare a water-based, aerosol marking composition.

DETAILED DESCRIPTION OF THE INVENTION

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

The present invention provides a stable aerosol composition that has sufficient adhesion to adhere to both porous and non-porous substrates, cannot be easily blown away, and is removable from the surface to which it has been applied by simple rubbing with a dry cloth, or by washing with water, or both. In certain highly preferred embodiments, the composition lacks binders such as an alkyd-based drying oil, polyvinylpyrrrolidone and polyvinyl alcohol. The aerosol marking composition may also be formulated to contain low toxicity levels and be non-flammable. Thus, the aerosol marking composition may be formulated to meet ACMI AP standards.

The aerosol spray marking composition of the present invention comprises from 5 to 50% by weight of a solvent selected from the group consisting of an aliphatic solvent, an aromatic solvent comprising 10 or fewer carbon atoms, an ether and an alcohol, or a combination thereof, preferably 5 to 10% by weight of an aliphatic petroleum distillate from C6 to C15 with a boiling point ranging from 65 to 205° C. and an evaporation rate of 0.12 to 6.3. The composition also comprises 0.1 to 4% by weight of an emulsifier with an HLB value ranging from 1.8 to 16.7, preferably 8.0 to 15.6. A conventional or fluorescent colorant or dye or any combination thereof, may be added in the range of 0.05% to 25%, preferably 5 to 15% by weight of the composition. Water is used as a carrier from 10 to 50% by weight of the composition and is preferably from 20 to 35% by weight of the composition. Antifreeze agent may be added from 0–10%, preferably 3–8% by weight of the composition. In certain embodiments, the composition comprises from 10 to 50%, preferably 20–40%, by weight inorganic filler, and, preferably, from 0.05 to 3% by weight surfactant. The composition comprises propellant in the range of 10 to 45%, preferably 20 to 35% by weight. Suitable propellants include propellants in the classes of propane, isobutane, n-butane, isopentane, n-pentane, fluorocarbon, or dimethyl ether. Fluorocarbon propellants are preferred to impart non-flammability characteristics. Optional corrosion inhibitors may also be added and are sold under the trade names of: Raybo 60, 80, 85, 90, & 95 from Raybo Chemical. Such inhibitors typically include mixtures of sodium nitrite, ammonium benzoate, 2-dimethylaminoethanol, sodium benzoate and Morpholine between 0.01 to 0.4%. The preferred loading is 0.04 to 0.10% of sodium benzoate and Morpholine respectively or 0.2 to 0.4% Raybo 80.

Binder

The present invention does not require a binder and yet unexpectedly has the required adhesion required for a temporary marking. It can be wiped off by simple mechanical wiping. Thus, the composition preferably lacks or contains only trace amounts of an alkyd-based drying oil, polyvinylpyrrrolidone, polyvinyl alcohol, or any other additional agent (e.g. sugar), that serves to enhance adhesion of the composition to a substrate.

Water

Water serves as the main carrier for the present invention. It also aids in imparting non-flammability to the spray marking composition.

Antifreeze Agent

Optionally, an antifreeze agent may be added to the composition. This serves to extend the temperature range over which the composition will effectively spray. Examples of antifreeze agents include: sodium chloride, magnesium chloride, calcium chloride, methanol, ethylene and propylene glycol, with propylene glycol being preferred due to its non-corrosive and non-flammable characteristics.

Emulsifier

Classes of emulsifiers include anionic or nonionic and the use of fatty diethanolamines, polyethylene glycol stearates, fatty esters, glycerol stearates, and sorbitan derivatives. The preferred emulsifier is a sorbitan derivative with a HLB (Hydrophile/Lipophile Balance) of between 1.8 and 16.7 with 8.0–15.6 preferred. This emulsifier serves to compatibilize aliphatic solvent with the water phase. Common trade names of emulsifiers include, but are not limited to, Sorbax from Chemax, Ethorbox from Ethox, and Tween from Uniqema.

Solvent

The solvent choices include an aliphatic solvent comprised of any carbon length between C6 and C15, an aromatic solvent that is C10 or less, an ether, an alcohol, and combinations of such solvents. The solvent may have a boiling point from 65 to 205° C. and an evaporation rate from 0.12 to 6.3. The solvent also serves to accelerate dry time.

Filler

Inorganic fillers such as calcium carbonate, clay, and barium sulfate provide a low-cost filler that provides opacity and serves as the "chalking agent" or temporary marking agent. HOM-60 produced by Mississippi Lime has the added feature of containing no detectable crystalline silica.

Surfactant

An anionic or nonionic surfactant is used to wet out the surface of the pigments and allow high loadings into the water phase of the emulsion. Trade names include Surfynol 104, Surfynol 440, Dynol™ 604, CT-136, CT-111, CT-121 and CT-131 from Air Products. CT-136 is preferred.

Marking Agent

A variety of suitable colorants for water-based aerosol paints are well known. Fluorescent pigments (fluorescent dyes encapsulated into resins) serve to provide bright color and provide a decorative effect for spray-marking composition applications. Conventional pigments or dyes, and fluorescent dyes may be used as stand alone colorants in this application. Conventional pigments or dyes encapsulated into resins may also be used. Conventional pigments used for coloration are well known in the art. They include the following classes: monoazo, disazo, phthalocyanine, anthraquinone, thioindigo, triphendioxazine, and quinacridone. Water soluble dyes of structure class: monozao, disazo, anthraquinone, xanthene, and azine. Titanium dioxide and calcium carbonate can be used to create a white spray marking composition. The preferred embodiment uses fluorescent pigments derived from an organic resins and fluorescent dyes. These pigments are well known and are described in previous patents: U.S. Pat. No. 2,498,592; U.S. Pat. No. 2,809,954; U.S. Pat. No. 3,303,168; U.S. Pat. No. 3,915,884; U.S. Pat. No. 3,945,980 and U.S. Pat. No. 4,975,220. They are available commercially from DayGlo Color as A/AX series, T/GT series, VR, Z, and ZQ. Phosphorescent pigments based on zinc sulfide and mixed metal oxides may also be used to create a glow-in-the-dark effect.

Corrosion Inhibitors

Optionally, the composition comprises a corrosion inhibitor. Typical corrosion inhibitors are sold under the Raybo trade name and consist of sodium benzoate, morpholine, sodium nitrite, ammonium benzoate, benzotriazole, 2-dimethylaminoethanol and dimethylethanolamine or mixtures thereof. The preferred inhibitors are morpholine and sodium benzoate or Raybo 80.

Propellant

Propellant may be used from the classes of: propane, isobutane, n-butane, isopentane, n-pentane, fluorocarbon, or dimethyl ether. A fluorocarbon propellant is preferred because it imparts non-flammable characteristics into the aerosol marking composition. The preferred fluorocarbon propellant is 1,1-difluoroethane available as Dymel 152a from DuPont. The amount should be enough to expel the entire contents of the marking composition composition from the aerosol can. Typical pressures range from 40 to 90 psig @ 70° F.

Preparation of the Composition:

The water-based, aerosol marking composition of the present invention may be prepared by charging the ingredients into a suitable vessel equipped with mechanical stirring and a dispersing blade, preferably of the cowles type. Water is added first, followed by a surfactant and an antifoaming agent, if desired. Next, anti-corrosion compounds may be added to the vessel. These first four ingredients may or may not be incorporated under shear. This mixture is then mixed until a suitable vortex is formed. The filler, if desired, is then added entirely under shear while maintaining a vortex. Pigments as described earlier may then also be incorporated into the mixture under shear while maintaining a vortex. Adequate time is given to achieve the proper grinding of the pigments. Typical grind times range from 20–30 minutes for large-scale production batches. Upon achievement of the proper grind stage, the emulsifier can then be added under shear. The final step for the marking composition liquid phase is to add the hydrocarbon solvent under shear to ensure adequate emulsification into the water phase. Again adequate shear time is given to completely emulsify the hydrocarbon portion of the mixture. Once this final grind stage is complete, the mixture may then be transferred to an appropriate filling line for the addition of the propellant.

EXAMPLES

The following examples are for purposes of illustration only and are not intended to limit the scope of the claims which are appended hereto.

Example 1

A water-based, aerosol marking composition was prepared by charging a vessel with 362.5 grams of water, followed by 3.4 grams of the nonionic surfactant Surfynol CT-136 from Air Products and 3.4 grams of Foamaster R antifoaming agent from Cognis. Next, 0.5 grams of the corrosion inhibitor Sodium Benzoate and 0.10 grams of the corrosion inhibitor Morpholine were added to the vessel. These last four ingredients were incorporated under shear. This material was then mixed until a suitable vortex was formed. Next, 390.6 grams of 8107 Calcium Carbonate filler from Specialty Minerals was added entirely under shear while maintaining the vortex followed by 76.6 grams of a rutile grade of titanium dioxide pigment (available as "Ti-Pure" from DuPont). 15 minutes was given to achieve the proper grinding of these pigments. Upon achievement of the proper grind stage, 4 grams of the nonionic emulsifier Tween 80 sorbitan monooleate from Uniqema and 98 grams of the aliphatic hydrocarbon solvent VM & P Naptha from Eastman were added to ensure adequate dry times and sprayability. After an additional 10 minutes the final grind stage was complete. The mixture was then transferred to a aerosol filling line and 45.54 grams of the propellant Dymel 152a from DuPont was added to 150 grams of the mixture.

The composition was sprayed on an aluminum substrate. The resulting mark adhered to the surface and could be removed by rubbing with a dry cloth or by washing with water. The composition was tested for its toxicity and received an ACMI AP rating.

Example 2

A water-based, aerosol marking composition was prepared by charging a vessel with 132.15 grams of water, followed by 1.7 grams of the surfactant Surfynol CT-136 and 1.7 grams of Foamaster R antifoaming agent. These ingredients were incorporated under shear. This composition was mixed until a suitable vortex was formed. Next, 196.05 grams of 8107 Calcium Carbonate filler from Specialty Minerals was added entirely under shear while a vortex was maintained. 68.3 grams of Day-Glo Color Corp. VR11 Aurora Pink fluorescent pigment was then incorporated into the mixture under shear while maintaining the vortex. Approximately 15 minutes of grind time was given to properly disperse the pigment. The mixture was combined with 66.95 grams of isopropanol and 33.15 grams of propylene glycol methyl ether from Eastman. The final step was to add 50 ml grams of Dymel 152a propellant from DuPont to 150 g of the water-based marking composition.

The composition was sprayed on an aluminum substrate. The resulting mark adhered to the surface and could be removed by rubbing with a dry cloth or by washing with water Example 3

A water-based, aerosol marking composition was prepared by charging 72.5 grams of water, followed by 0.68 grams of Surfynol CT-136 and 0.68 grams of Foamaster R antifoaming agent to a vessel. Next, 0.10 grams of Sodium Benzoate and 0.20 grams of Morpholine were added to the vessel. The last three ingredients were incorporated under shear. The mixture was then mixed until a suitable vortex was formed. Next, 78.12 grams of HOM-60 Calcium Carbonate filler from Mississippi Lime was added entirely under shear while maintaining the vortex. 27.32 grams of VR-15 Blaze Orange fluorescent pigment from Day-Glo Color Corp. was then incorporated into the mixture under shear while maintaining the vortex. The grind time to achieve proper dispersion was 15 minutes. Upon achievement of the proper grind stage, 0.8 grams of a sorbitan derivative emulsifier (Tween 80 from Uniqema) was then added under shear. The final step for preparing the liquid phase of the composition was to add 19.6 grams of VM & P Naptha solvent to the mixture to form an oil in water emulsion. The emulsion was then transferred to an aerosol filler and 50 ml of Dymel 152A propellant from DuPont CPC was added to 150 g of the composition.

The composition was sprayed on an aluminum substrate. The resulting mark adhered to the surface and could be removed by rubbing with a dry cloth or by washing with water. The composition was tested for its toxicity and received an ACMI AP rating.

Example 4

A water-based, aerosol spray marking composition was prepared by charging 72.5 grams of water and 0.68 grams of nonionic surfactant Surfynol CT136 from Air Products and 0.68 grams of Foamaster R defoamer to a vessel. Next 0.1 grams of sodium benzoate and 0.2 grams of morpholine were added under shear. 78.12 grams of HOM 60 calcium carbonate from Mississippi Lime and 27.32 grams of 8107 calcium carbonate from Barretts Minerals were also added under shear while maintaining a vortex for 15 minutes. 0.8 grams of the surfactant Tween 80 from Uniqema and 19.6 grams of the aliphatic hydrocarbon solvent VM & P Naptha were added to form an emulsion and mixed for another 5 minutes. The liquid composition was then transferred to an aerosol filling line for the addition of 84.4 ml of A-85 propellant from Diversified CPC.

The composition was sprayed on an aluminum substrate. The resulting mark adhered to the surface and could be removed by rubbing with a dry cloth or by washing with water. The composition was tested for its toxicity and received an ACMI AP rating.

Example 5

A water-based, aerosol marking composition was prepared by charging a vessel with 725 grams of water, followed by 6.8 grams of Surfynol CT-136 and 6.8 grams of Foamaster R antifoaming agent. Next, 1.0 gram of Sodium Benzoate and 2.0 grams of Morpholine were added to the vessel. The last three ingredients were incorporated under shear. This mixture was then mixed until a suitable vortex was formed. Next, 781.20 grams of HOM60 filler from Mississippi Lime Co. was then added entirely under shear while maintaining a vortex. 273.20 grams of GT-21 Corona Magenta fluorescent pigment from Day-Glo Color Corp. was then incorporated into the mixture under shear while maintaining the vortex. 15 minutes was given to achieve the proper grinding of the pigments. Upon achievement of the proper grind stage, 8 grams of Tween 80 from Uniqema and 196 grams of VM&P Naptha was added to ensure adequate dry time. The mixture was then transferred to an aerosol filler where 50 ml of Dymel 152a propellant from DuPont was added to 150 grams of the liquid composition.

The composition was sprayed on an aluminum substrate. The resulting mark adhered to the surface and could be removed by rubbing with a dry cloth or by washing with water.

Example 6

A water-based, aerosol marking composition was prepared by charging a vessel; with 72.2 grams of water, followed by 0.64 grams of the surfactant Surfynol CT-136 and 0.64 grams of AC-823 antifoaming agent from Acqueous Concepts. Next, 1.0 gram of the corrosion inhibitor Raybo 80 from Raybo Chemical was added to the vessel and 0.76 grams of the surfactant Tween 80 from Uniqema. The last four ingredients were incorporated under shear. This mixture was then mixed until a suitable vortex was formed. Next, 67.08 grams of HOM 60 filler from Mississippi Lime Co. was then added entirely under shear while maintaining a vortex. 9.72 grams of VR21 Corona Magenta and 16.28 grams of VR00 Clear fluorescent pigment from Day-Glo Color Corp. was then incorporated into the mixture under shear while maintaining the vortex. 15 minutes was given to achieve the proper grinding of the pigments. Upon achievement of the proper grind stage, 13.02 grams of propylene glycol and 18.66 grams of the aliphatic hydrocarbon solvent VM & P Naptha from Eastman Chemical was added to ensure adequate dry time. The mixture was then transferred to an aerosol filler where 50 ml of Dymel 152a from Dupont was added to 150 grams of the liquid composition.

With 152a propellant the mixture is considered non-flammable and will not require a flammability warning on the finished aerosol can according to flame extension test 16 CFR 1500.45. The final composition has been certified as non-flammable according to 1500.3C(6) VIII.

The composition was sprayed on an aluminum substrate. The resulting mark adhered to the surface and could be removed by rubbing with a dry cloth or by washing with water. The composition was also sprayed on a non-porous paint film on a car, and adhered to the surface of this substrate when the car was driven at 65 mph. The composition was tested for its toxicity and received an ACMI AP rating.

What is claimed is:

1. An aqueous aerosol composition for marking a surface comprising:
   10 to 50% by weight water;
   5 to 50% by weight of a solvent selected from the group consisting of a C6 to C15 aliphatic solvent, an aromatic solvent comprising 10 or fewer carbon atoms, an ether and an alcohol, or any combination thereof;
   0.1 to 4% by weight of an emulsifier having a hydrophile to lipophile balance of from 1.8 to 16.7;
   a fluorescent pigment, and
   10 to 45% by weight of a propellant;
   wherein the marking composition lacks a binder or contains only trace amounts of a binder and is removable from the surface by rubbing with a dry cloth, or washing with water, or both.

2. The composition of claim 1, wherein the solvent is an aliphatic hydrocarbon.

3. The composition of claim 2, wherein the composition comprises less than 10% by weight of the aliphatic hydrocarbon solvent; wherein the composition comprises a filler that is free of detectable crystalline silica; and wherein the composition is non-toxic.

4. An aqueous aerosol for marking a surface comprising:
   10 to 50% by weight water;
   5 to 50% by weight of a solvent selected from the group consisting of a C6 to C15 aliphatic solvent, an aromatic solvent comprising 10 or fewer carbon atoms, an ether and an alcohol, or any combination thereof;
   0.1 to 4% by weight of an emulsifier having a hydrophile to lipophile balance of from 1.8 to 16.7, wherein the emulsifier is a sorbitan derivative;
   a marking agent; and
   10 to 45% by weight of a propellant;
   wherein the marking composition lacks a binder or contains only trace amounts of a binder and is removable from the surface by rubbing with a dry cloth, or washing with water, or both.

5. An aqueous aerosol composition for marking a surface comprising:
   10 to 50% by weight water;
   5 to 50% by weight of an aliphatic petroleum distillate with a boiling point range of 65 to 205° C. and an evaporation rate of 0.12 to 6.3;
   0.1 to 4% by weight of an emulsifier having a hydrophile to lipophile balance of from 1.8 to 16.7;
   a marking agent; and
   10 to 45% by weight of a propellant;
   wherein the marking composition lacks a binder or contains only trace amounts of a binder and is removable from the surface by rubbing with a dry cloth, or washing with water, or both.

6. The composition of claim 5, wherein the hydrophile to lipophile ratio of the emulsifier is from 8.0 to 15.6.

7. An aqueous aerosol spray composition for marking a surface comprising:
   10 to 50% by weight water;
   5 to 50% by weight of a solvent selected from the group consisting of a C6 to C15 aliphatic solvent, an aromatic solvent comprising 10 or fewer carbon atoms, an ether, and an alcohol, or a combination of said solvents;
   0.1 to 4% by weight of an emulsifier having a hydrophile to lipophile balance of from 1.8 to 16.7, wherein the emulsifier is a sorbitan derivative;
   0 to 3% surfactant;
   a marking agent;
   0 to 0.4% by weight of a corrosion inhibitor;
   0 to 10% by weight of an antifreeze agent;
   0 to 50% by weight of an inorganic filler; and
   10 to 45% by weight of a propellant;
   wherein the marking composition lacks or contains only trace amounts of an alkyd-based drying oil, polyvinylpyrrrolidone, polyvinyl alcohol or a combination thereof; and
   wherein the mark formed by the marking composition is removable from the surface by rubbing with a dry cloth, or washing with water, or both.

8. The composition of claim 7, wherein the composition lacks or contains only trace amounts of a sugar.

9. An aqueous aerosol composition for marking a surface comprising:
   10 to 50% by weight water;
   5 to 50% by weight of a solvent selected from the group consisting of a C6 to C15 aliphatic solvent , an aromatic solvent comprising 10 or fewer carbon atoms, an ether, and an alcohol, or a combination of said solvents;
0.1 to 4% by weight of an emulsifier having a hydrophile to lipophile balance of from 1.8 to 16.7;
0 to 3% surfactant;
a fluorescent pigment;
0 to 0.4% by weight of a corrosion inhibitor;
0 to 10% by weight of an antifreeze agent;
0 to 50% by weight of an inorganic filler; and
10 to 45% by weight of a propellant;
wherein the marking composition lacks or contains only trace amounts of an alkyd-based drying oil, polyvinylpyrrolidone, polyvinyl alcohol or any combination thereof; and wherein the mark formed by the marking composition is removable from the surface by rubbing with a dry cloth, or washing with water, or both.

10. An aqueous aerosol composition for marking a surface comprising:
10 to 50% by weight water;
5 to 10% of an aliphatic petroleum distillate with a boiling point range of 65 to 205° C. and an evaporation rate of 0.12 to 6.3;
0 to 3% surfactant;
a marking agent;
0 to 0.4% by weight of a corrosion inhibitor;
0 to 10% by weight of an antifreeze agent;
0 to 50% by weight of an inorganic filler; and
10 to 45% by weight of a propellant;
wherein the marking composition lacks or contains only trace amounts of an alkyd-based drying oil, polyvinylpyrrolidone, polyvinyl alcohol or a combination thereof; and wherein the mark formed by the marking composition is removable from the surface by rubbing with a dry cloth, or washing with water, or both.

11. The composition of claim 7, wherein the hydrophile to lipophile ratio of the emulsifier is from 8.0 to 15.6.

12. An aqueous composition for forming a water-based, spray marking composition, comprising:
10 to 50% by weight water;
5 to 50% by weight of an aliphatic petroleum distillate with a boiling point range of 65 to 205° C. and an evaporation rate of 0.12 to 6.3;
0.1 to 4% by weight of an emulsifier having a hydrophile to lipophile balance of from 1.8 to 16.7;
0 to 3% by weight of a surfactant;
a marking agent;
0 to 0.4% by weight of a corrosion inhibitor;
0 to 10% by weight of antifreeze agent; and
0 to 50% by weight of an inorganic filler;
wherein the marking composition lacks a binder or contains only trace amounts of a binder and is removable from the surface by rubbing with a dry cloth or washing with water or both.

13. The composition of claim 9, wherein the composition lacks or contains only trace amounts of a sugar.

14. The composition of claim 12, wherein the emulsifier is a sorbitan derivative.

15. The composition of claim 12, wherein the composition comprises a filler that is free of detectable crystalline silica; and wherein the composition is non-toxic.

16. The composition of claim 5, wherein the marking agent is a pigment or dye, or combinations thereof.

17. The composition of claim 5, wherein the marking agent is titanium dioxide, calcium carbonate, or a combination thereof.

18. The composition of claim 5, wherein the composition comprises from 0.05% to 25% by weight of said marking agent.

19. The composition of claim 5, wherein the composition comprises calcium carbonate, clay, titanium dixoide, barium sulfate, or combinations thereof.

20. The composition of claim 7, wherein the propellant imparts non-flammability characteristics and the composition is non-flammable.

21. The composition of claim 9, wherein the propellant imparts non-flammability characteristics and the composition is non-flammable.

22. The composition of claim 10, wherein the propellant imparts non-flammability characteristics and the composition is non-flammable.

23. The composition of claim 7, wherein the propellant is selected from the group consisting of propane, isobutane, n-butane, isopentane, n-pentane, fluorocarbon, and dimethyl ether, or a combination thereof.

24. The composition of claim 9, wherein the propellant is selected from the group consisting of propane, isobutane, n-butane, isopentane, n-pentane, fluorocarbon, and dimethyl ether, or a combination thereof.

25. The composition of claim 10, wherein the propellant is selected from the group consisting of propane, isobutane, n-butane, isopentane, n-pentane, fluorocarbon, and dimethyl ether, or a combination thereof.

26. The composition of claim 12, wherein the composition contains only trace amounts of a sugar.

27. An aqueous composition for forming a water-based, spray marking composition, comprising:
10 to 50% by weight water;
5 to 50% by weight of a solvent selected from the group consisting of a C6 to C15 aliphatic solvent, an aromatic solvent comprising 10 or fewer carbon atoms, an ether and an alcohol, or a combination of said solvents;
0.1 to 4% by weight of an emulsifier having a hydrophile to lipophile balance of from 1.8 to 16.7;
0 to 3% by weight of a surfactant;
a fluorescent pigment;
0 to 0.4% by weight of a corrosion inhibitor;
0 to 10% by weight of antifreeze agent; and
0 to 50% by weight of an inorganic filler;
wherein the marking composition lacks a binder or contains only trace amounts of a binder and is removable from the surface by rubbing with a dry cloth or washing with water or both.

28. An aqueous composition for forming a water-based, spray marking composition, comprising:
10 to 50% by weight water;
5 to 50% by weight of a solvent selected from the group consisting of a C6 to C15 aliphatic solvent, an aromatic solvent comprising 10 or fewer carbon atoms, an ether and an alcohol;
0.1 to 4% by weight of an emulsifier having a hydrophile to lipophile balance of from 1.8 to 16.7, wherein the emulsifier is a sorbitan derivativ;
0 to 3% by weight of a surfactant;
a marking agent;
0 to 0.4% by weight of a corrosion inhibitor;
o to 10% by weight of antifreeze agent; and
0 to 50% by weight of an inorganic filler;
wherein the marking composition lacks a binder or contains only trace amounts of a binder and is removable from the surface by rubbing with a dry cloth or washing with water or both.

* * * * *